US012627540B2

(12) United States Patent (10) Patent No.: US 12,627,540 B2
Minotani et al. (45) Date of Patent: May 12, 2026

(54) CONNECTING CIRCUIT AND COMMUNICATION INTERFACE

(71) Applicants: NTT, Inc., Tokyo (JP); NTT Innovative Devices Corporation, Yokohama (JP)

(72) Inventors: Tadashi Minotani, Tokyo (JP); Toshiki Kishi, Tokyo (JP); Masatoshi Tobayashi, Yokohama (JP); Yoshikazu Urabe, Yokoyama (JP)

(73) Assignees: NTT, INC., Tokyo (JP); NTT INNOVATIVE DEVICES CORPORATION, Yokohama (JP)

( * ) Notice: Subject to any disclaimer, the term of this patent is extended or adjusted under 35 U.S.C. 154(b) by 197 days.

(21) Appl. No.: 18/551,660

(22) PCT Filed: Mar. 25, 2022

(86) PCT No.: PCT/JP2022/014485
§ 371 (c)(1),
(2) Date: Sep. 21, 2023

(87) PCT Pub. No.: WO2022/203054
PCT Pub. Date: Sep. 29, 2022

(65) Prior Publication Data
US 2024/0097948 A1 Mar. 21, 2024

(30) Foreign Application Priority Data
Mar. 25, 2021 (JP) ................................. 2021-051313

(51) Int. Cl.
*H04L 25/06* (2006.01)
*H04L 25/02* (2006.01)

(52) U.S. Cl.
CPC .............. *H04L 25/06* (2013.01); *H04L 25/02* (2013.01)

(58) Field of Classification Search
CPC ..... H04L 25/06; H04L 7/0029; H04L 7/0041; H04L 7/0075; H04L 25/0298;
(Continued)

(56) References Cited

U.S. PATENT DOCUMENTS

2016/0218854 A1 7/2016 Chong
2022/0082874 A1* 3/2022 Kaikkonen ........... H01S 5/0265

FOREIGN PATENT DOCUMENTS

JP 2007267015 A 10/2007

OTHER PUBLICATIONS

Goto, H., "Intel's packaging technology is quietly advancing in the chiplet race," https://pc.watch.impress.co.jp/docs/column/kaigai/1227139.html, Dec. 27, 2019, 8 pages, as described in the Specification.
(Continued)

*Primary Examiner* — Jung Kim
(74) *Attorney, Agent, or Firm* — Slater Matsil, LLP

(57) ABSTRACT

An embodiment is a connecting circuit connected to the preceding stage of a transmission circuit and configured to receive a data signal includes an initial voltage value holding circuit, and a terminating load connected in series with the initial voltage value holding circuit. The initial voltage value holding circuit outputs, to the terminating load, an initial voltage value obtained when no data signal is input, and sets both ends of the terminating load at the same potential by a DC component.

16 Claims, 7 Drawing Sheets

(58) Field of Classification Search
CPC ... H04L 7/002; H04L 7/0033; H04L 25/0264;
H04L 25/028; G06F 13/4086; H03K
19/0005; H03K 19/017545; H03K
19/01825; H03K 19/018557; H05K
1/0246
See application file for complete search history.

(56)                    References Cited

OTHER PUBLICATIONS

International Bureau, "Notification Concerning Transmittal of International Preliminary Report on Patentability (Chapter 1 of The Patent Cooperation Treaty)," International application No. PCT/JP2022/014485, Oct. 5, 2023, 9 pages.
International Searching Authority, "Written Opinion of the International Searching Authority," International application No. PCT/JP2022/014485, Jun. 21, 2022, 6 pages.
Japan Patent Office, "International Search Report," International application No. PCT/JP2022/014485, Jun. 21, 2022, 5 pages.

* cited by examiner

TRANSMISSION INTERFACE

CONNECTING CIRCUIT AND COMMUNICATION INTERFACE

CROSS-REFERENCE TO RELATED APPLICATIONS

This patent application is a national phase entry of PCT application Ser. No., PCT/JP2022/014485 filed on Mar. 25, 2022, which claims priority to Japanese Patent application Ser. No., 2021-051313 filed on Mar. 25, 2021. Both of the aforementioned applications are hereby incorporated by reference in their entireties.

TECHNICAL FIELD

The present invention relates to a connecting circuit connected to a transmission circuit, and a communication interface.

BACKGROUND

To improve the data processing capability of a computer, a large amount of data needs to be transmitted/received to/from the computer. To do so, it is promising to use many high-speed interfaces such as optical communication for transmission/reception. In some cases, the chip of a CPU or GPU serving as the data processing part of the computer and the chip of an optical communication interface are separately manufactured and connected by wiring on a board. At this time, a chip capacitor for a DC block is sometimes inserted to block a DC current flowing through a path between the chip of the CPU or GPU serving as a data source and the chip of the optical communication interface.

In a connection form in a conventional transmission interface 4, as shown in FIG. 8, a transmission circuit 44 is biased at a bias voltage suited to the transmission circuit 44, and a data source 3 and the communication interface 4 are separated by a chip capacitor 41 to prevent a DC current from flowing through a connection with the data source 3 to change the bias voltage. As the chip capacitor 41, a large capacitor of 0.1 μF or the like is often used.

The data source 3 and the transmission circuit 44 are often connected using a transmission line 2 for transmitting a high-frequency signal with a low distortion, and a terminating load (resistor) 40 of the transmission line 2 is arranged in the transmission interface 4. In general, the terminating load 40 has a resistance of 50Ω, and the chip capacitor 41 and the terminating load 40 form a high-pass filter having a cutoff frequency of about 32 kHz. A 0.1-μF capacitor is necessary to form a high-pass filter of a cutoff frequency by arranging the chip capacitor 41 on the preceding stage of the terminating load 40 of the transmission line 2.

In this connection form, the chip of the CPU or GPU serving as the data processing part of the computer is often mounted on a package substrate such as a buildup substrate. When the chip for optical communication is also mounted on the package substrate, the chip capacitor for the DC block needs to be removed because of a limited area of the package substrate.

A connection form using a transmission interface 5 shown in FIG. 9 is considered, in which the chip capacitor is removed from the connection form in the conventional transmission interface 4. In this connection form, a capacitor 51 is arranged on the subsequent stage of a terminating load 50 to prevent an increase in cost caused by the formation of a 0.1-μF capacitor within the chip, and a resistor 52 having a high resistance value is arranged between a transmission circuit 54 and a bias circuit 53, forming a high-pass filter.

RELATED ART LITERATURE

Non-Patent Literature

Non-Patent Literature 1:
https://pc.watchimpress.co.jp/docs/column/kaigai/1227139.html

SUMMARY

Problem to be Solved by Embodiments of the Invention

However, in this connection form, the terminating load 50 and the data source 3 are series-connected, and thus a DC current flows through the transmission line 2 and the terminating load 50. The DC current causes problems such as an increase in power consumption of the data source 3 and disconnection of the transmission line 2.

It is an object of the present invention to provide a connecting circuit and a communication interface that can suppress a DC current flowing from a data source to a terminating load on the preceding stage of a transmission circuit without arranging a chip capacitor between the data source and a transmission interface.

Means of Solution to the Problem

To solve the above-described problems, according to embodiments of the present invention, there is provided a connecting circuit connected to a preceding stage of a transmission circuit to which a data signal is input, comprising an initial voltage value holding unit, and a terminating load connected in series with the initial voltage value holding unit, wherein the initial voltage value holding unit outputs, to the terminating load, an initial voltage value obtained when the data signal is not input, and sets both ends of the terminating load at the same potential by a DC component.

According to embodiments of the present invention, there is provided a connecting circuit comprising a frame detection circuit, a signal delay circuit connected in parallel with the frame detection circuit, a sample-and-hold circuit configured to receive an output of the signal delay circuit, the sample-and-hold circuit receiving an output of the frame detection circuit, a voltage maintenance circuit configured to receive an output of the sample-and-hold circuit, and a terminating load to which an output of the voltage maintenance circuit is applied, wherein the sample-and-hold circuit holds and outputs the output of the signal delay circuit in response to the output of the frame detection circuit.

According to embodiments of the present invention, there is provided a connecting circuit connected to a preceding stage of a plurality of transmission circuits, comprising an inter-channel interpolation bias detection circuit configured to detect a signal of a low voltage among a plurality of input data signals, a voltage maintenance circuit configured to receive an output of the inter-channel interpolation bias detection circuit, and a plurality of terminating loads to which an output of the voltage maintenance circuit is applied.

Effect of Embodiments of the Invention

According to embodiments of the present invention, a connecting circuit and a communication interface that can suppress a DC current flowing from a data source to a terminating load on the preceding stage of a transmission circuit without arranging a chip capacitor between the data source and a transmission interface can be provided.

BRIEF DESCRIPTION OF THE DRAWINGS

Figures 8, 9:
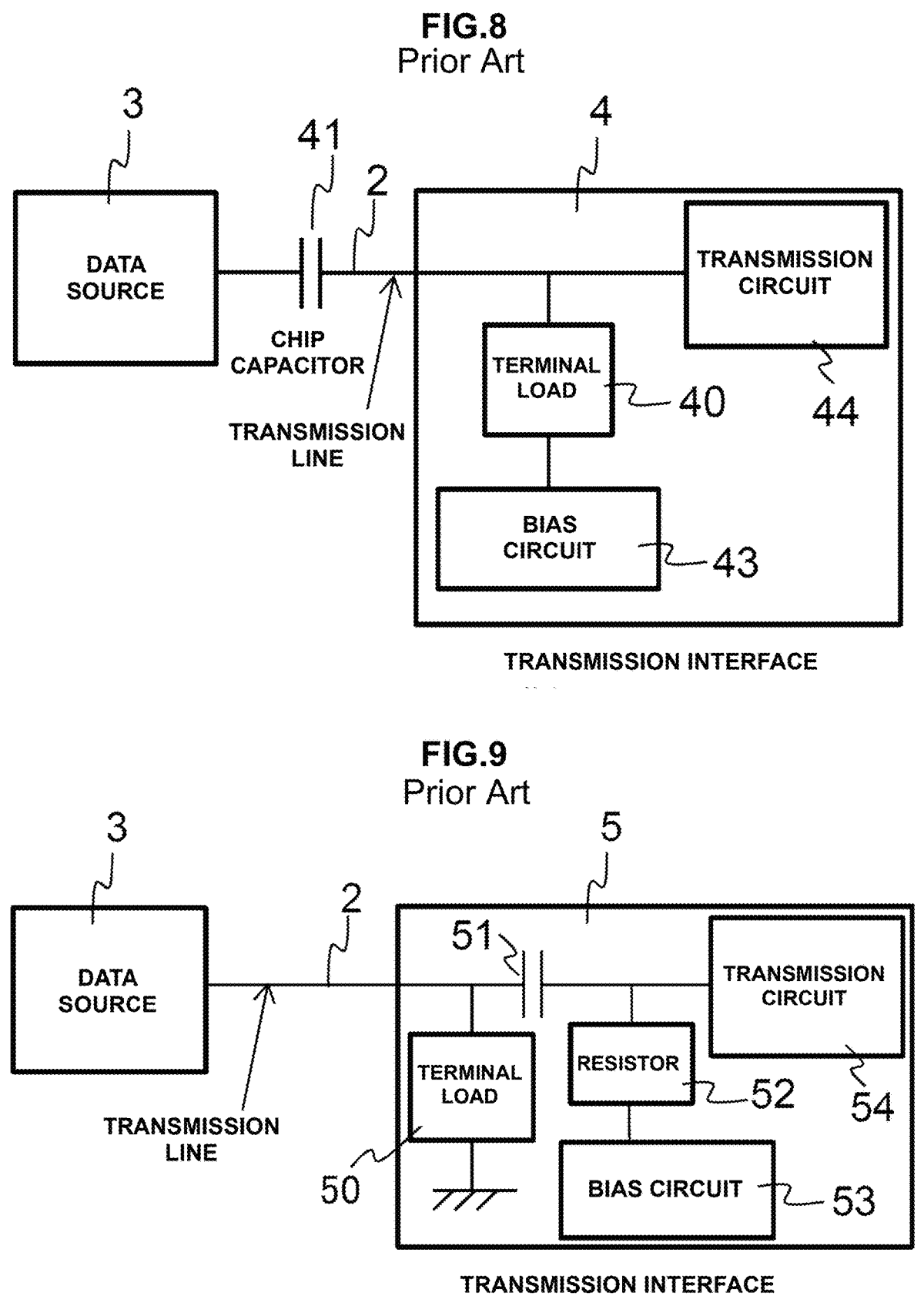

FIG. 8 is a block diagram showing the connection form of a conventional transmission interface; and FIG. 9 is a block diagram showing the connection form of a conventional transmission interface.

DETAILED DESCRIPTION OF ILLUSTRATIVE EMBODIMENTS

First Embodiment

A connecting circuit and a communication interface according to the first embodiment of the present invention will be described with reference to FIGS. 1 to 3.
<Arrangements of Connecting Circuit and Communication Interface>

Figure 1:
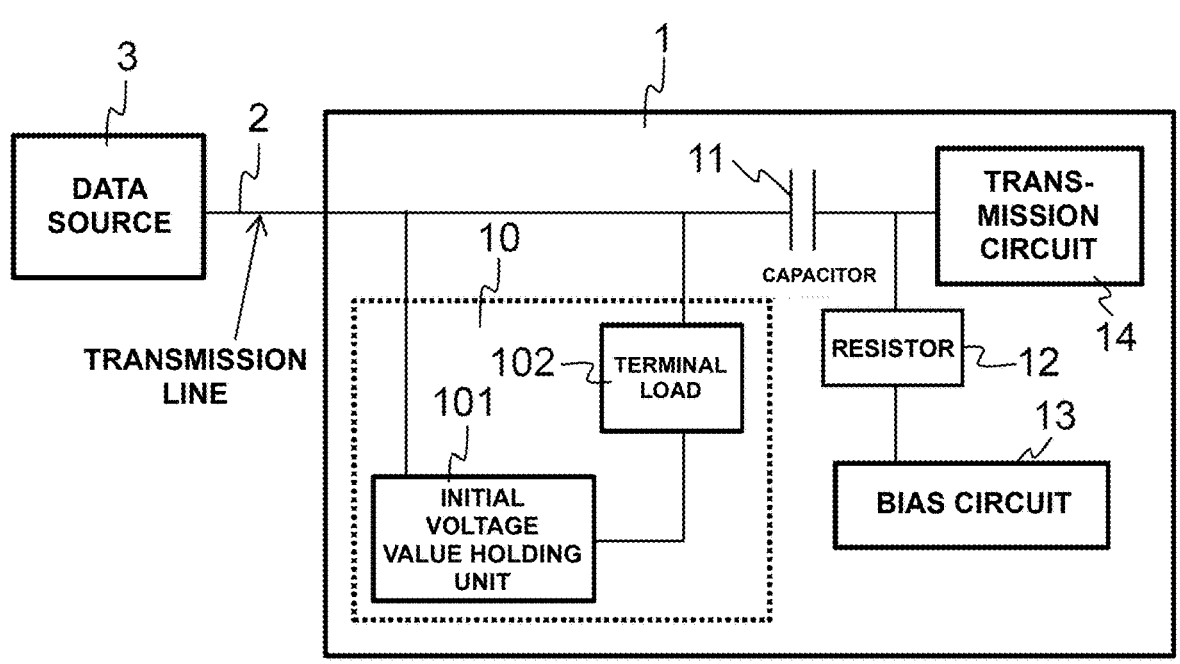
FIG. 1 is a block diagram showing the arrangement of a transmission interface using a connecting circuit according to the first embodiment of the present invention.

As shown in FIG. 1, a transmission interface 1 using a connecting circuit 10 according to the embodiment includes the connecting circuit 10 according to the embodiment, a capacitor 11, a resistor 12, a bias circuit 13, and a transmission circuit 14. A high-pass filter is constituted by arranging the resistor 12 between the capacitor 11 and the bias circuit 13. The connecting circuit 10 is connected to the preceding stage of the high-pass filter.

More specifically, in the transmission interface 1, the connecting circuit 10 is connected in parallel with a transmission line 2 connected to a data source 3, the transmission circuit 14 is connected to the subsequent stage of the connecting circuit 10 via the capacitor 11, and the resistor 12 and the bias circuit 13 are connected in order to the input of the transmission circuit 14. The data source 3 is a CPU, a GPU, or the like.

Figure 2:
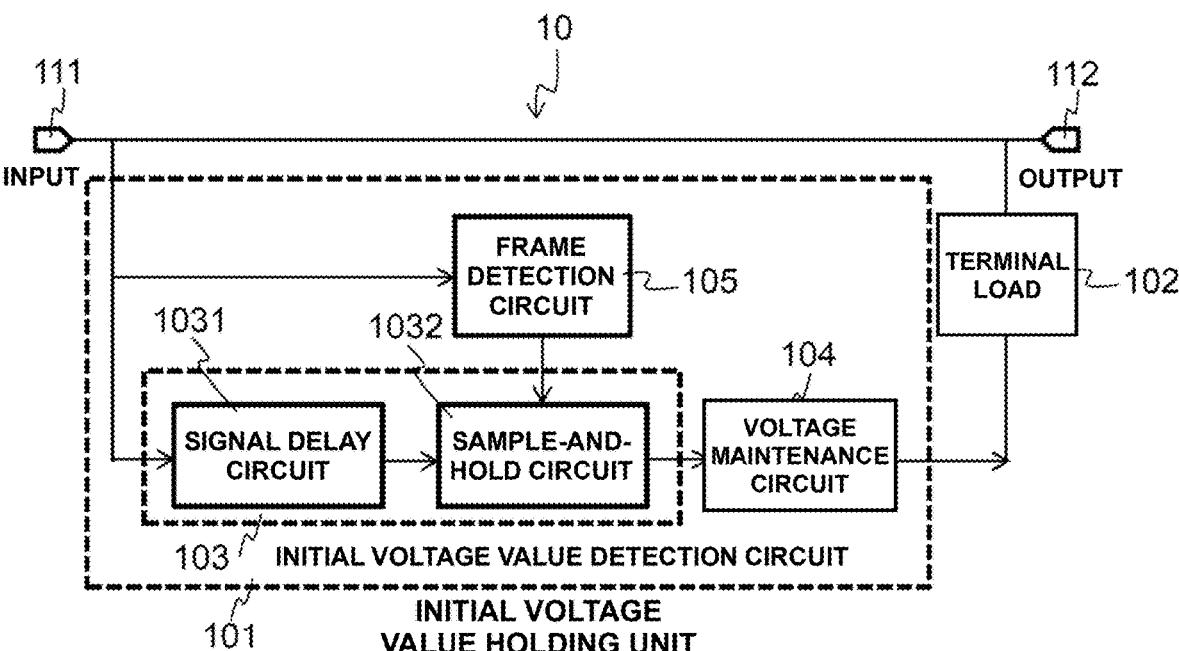
FIG. 2 is a block diagram showing the arrangement of the connecting circuit according to the first embodiment of the present invention.

As shown in FIG. 2, the connecting circuit 10 according to the embodiment includes an initial voltage value holding unit 101 (also referred to as an initial voltage value holding circuit 101) and a terminating load 102. In the connecting circuit 10, the initial voltage value holding unit 101 and the terminating load 102 are connected in order from an input terminal in side, and the terminating load 102 is connected to an output terminal 112 of the connecting circuit 10.

The initial voltage value holding unit 101 includes a frame detection circuit 105, an initial voltage value detection circuit 103, and a voltage maintenance circuit 104. The initial voltage value holding unit 101 detects a voltage (to be referred to as an "initial voltage value" hereinafter) obtained when a signal (to be referred to as a "data signal" hereinafter) of the data source 3 is not input, and then biases the terminating load 102.

The frame detection circuit 105 detects input of a data signal and outputs a frame detection signal. The frame detection circuit 105 can be constituted by a multivibrator circuit, a chattering elimination RS latch circuit, a low-pass filter, or the like.

The initial voltage value detection circuit 103 includes a signal delay circuit 1031 and a sample-and-hold circuit 1032 in order from the input terminal in side. The initial voltage value detection circuit 103 detects an initial voltage value obtained when no data signal is input, holds the initial voltage value in response to input of a frame detection signal, and outputs the initial voltage value.

The voltage maintenance circuit 104 outputs a voltage so that the voltage of a terminal connected to the voltage maintenance circuit 104 becomes the initial voltage value even if the voltage of a terminal connected to the data source 3 in the terminating load 102 changes.

In the initial voltage value holding unit 101, the frame detection circuit 105 and the signal delay circuit 1031 of the initial voltage value detection circuit 103 are connected in parallel with the input terminal in, the output of the frame detection circuit 105 is input (connected) to the sample-and-hold circuit 1032 of the initial voltage value detection circuit 103, the output of the sample-and-hold circuit 1032 of the initial voltage value detection circuit 103 is input (connected) to the voltage maintenance circuit 104, and the output of the voltage maintenance circuit 104 is applied as the output of the initial voltage value holding unit 101 to the terminating load 102.
<Operation of Connecting Circuit>

The operation of the connecting circuit 10 according to the embodiment will be described with reference to FIG. 3.

First, the operation of the initial voltage value holding unit 101 will be explained. Before a data signal is input to the initial voltage value holding unit 101, the data source 3 outputs a low voltage VL as an initial voltage value. After a signal is input, the waveform changes between a high voltage VH and the low voltage VL from the start of data of the signal in accordance with the data (151 in FIG. 3).

Figure 3:
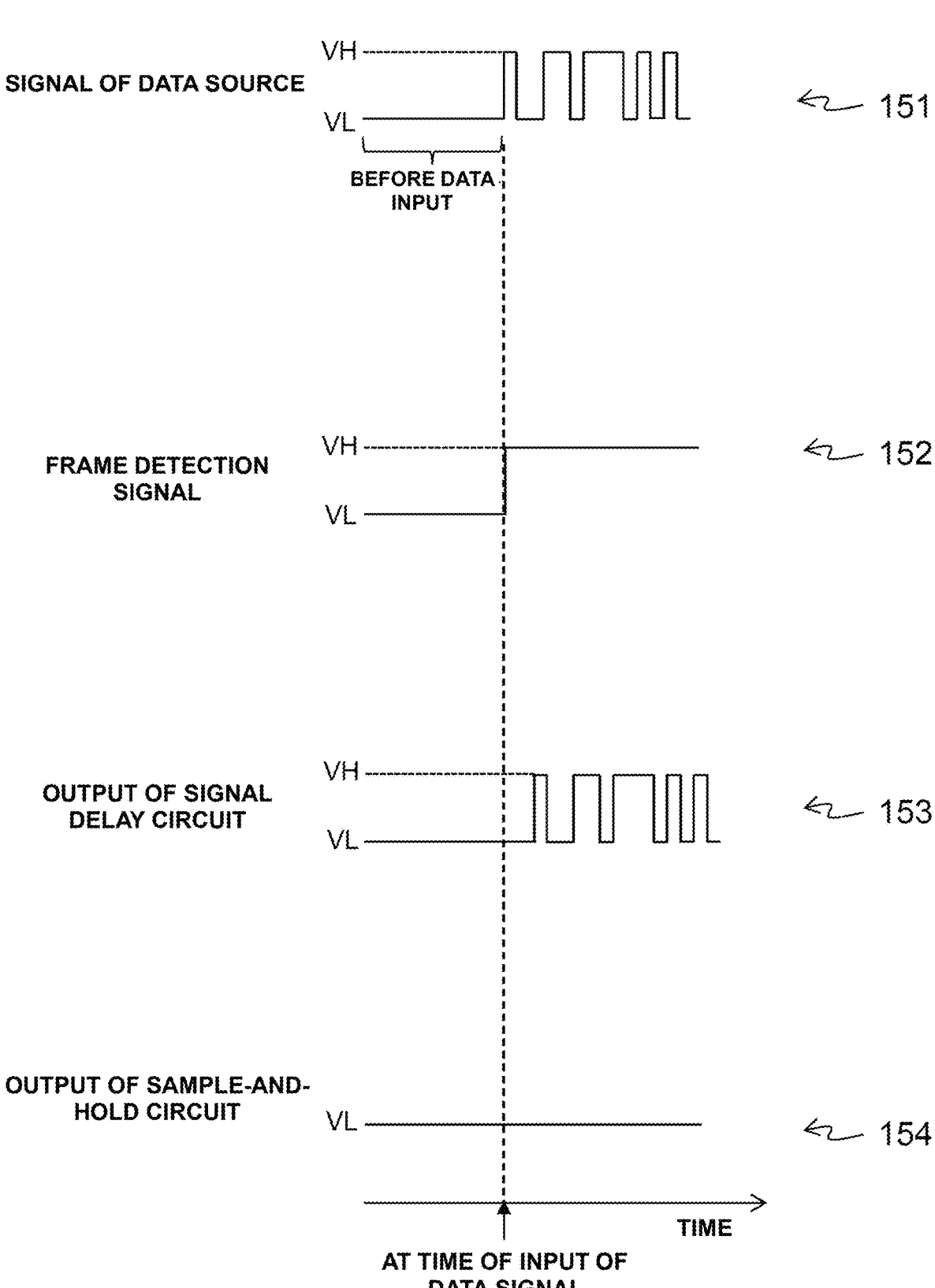
FIG. 3 is a timing chart for explaining the operation of the connecting circuit according to the first embodiment of the present invention.

The frame detection circuit 105 reads the change of the data signal, outputs a frame detection signal at the high voltage VH, and once the frame detection signal is output at the high voltage VH, keeps outputting it (152 in FIG. 3). After that, under a predetermined condition such that the low voltage VL continues for a predetermined time in the data signal, the frame detection circuit 105 stops the output of the high voltage VH and outputs the low voltage VL (not shown).

For example, in a case where a multivibrator circuit is used for the frame detection circuit 105, the multivibrator circuit outputs a rectangular wave (high voltage VH) of a predetermined time width in accordance with input of a data signal, continues the output for a predetermined time, and then outputs the low voltage VL.

For example, in a case where an RS latch circuit is used for the frame detection circuit 105, the RS latch circuit outputs the high voltage VH when a data signal is input (high voltage VH) to the other terminal of the RS latch circuit in a state in which no data signal is input to one terminal (not shown). Even when the data signal input to the other terminal changes to the low voltage VL, the RS latch circuit maintains the output of the high voltage VH. After that, when a data signal is input to one terminal (not shown), the RS latch circuit outputs the low voltage VL.

For example, in a case where a low-pass filter is used for the frame detection circuit 105, when a data signal including the high voltage VH is input, the signal change is relaxed and flattened, and the low-pass filter keeps outputting the frame detection signal. When the output of the low voltage VL continues in the data signal, the output of the flattened signal changes to the low voltage VL. Further, a comparator circuit can be connected to the subsequent stage of the low-pass filter to output the frame detection signal at the high voltage VH when the output of the low-pass filter is equal to or higher than a predetermined threshold, and output the frame detection signal at the low voltage VL when the output of the low-pass filter keeps lower than the predetermined threshold.

The signal delay circuit 1031 delays the data signal (153 in FIG. 3). As a result, when the frame detection signal is output, the output of the signal delay circuit 1031 is still at the low voltage VL of the initial voltage value before input of the data signal.

The signal delayed by the signal delay circuit 1031 is input to the sample-and-hold circuit 1032. Before the data signal is input to the connecting circuit 10, the sample-and-hold circuit 1032 outputs the initial voltage value (low voltage VL) without any change. After the data signal is input to the connecting circuit 10, when the above-mentioned frame detection signal is input to the sample-and-hold circuit 1032, the signal delay circuit 1031 inputs, to the sample-and-hold circuit 1022 at the low voltage VL, the initial voltage value before input of the data signal. As a result, even after the data signal is input to the connecting circuit 10, the initial voltage value (low voltage VL) is held and output to voltage maintenance circuit 104 (154 in FIG. 3).

Hence, the initial voltage value (low voltage VL) is applied to a terminal (one terminal) of the terminating load 102 on the initial voltage value holding unit 101 side regardless of input of a data signal.

Before a data signal is input, the initial voltage value is applied at the low voltage VL to even a terminal (the other terminal) of the terminating load 102 that is connected to the data source 3. As a result, the same voltage is applied as the DC component of the signal to the two ends of the terminating load 102. Since there is no potential difference between the two ends of the terminating load 102, no DC current flows from the data source 3 to the terminating load 102.

After a data signal is input, the voltage of the data signal changes, and a high-frequency data signal is transferred to the transmission circuit at the cutoff frequency of the high-pass filter constituted by the capacitor 11, the resistor 12, and the bias circuit 13 on the subsequent stage. At this time, VL as the DC component of the data signal is applied to the terminal (the other terminal) of the terminating load 102 that is connected to the data source 3.

In contrast, the terminal (one terminal) of the terminating load 102 on the initial voltage value holding unit 101 side is maintained at the low voltage VL of the initial voltage value, as described above. Thus, the same voltage is applied by the DC component to the two ends of the terminating load 102. Since there is no potential difference between the two ends of the terminating load 102, no DC current flows from the data source 3 to the terminating load 102.

As described above, the connecting circuit according to the embodiment can suppress a DC current flowing from the data source to the terminating load on the preceding stage of the transmission circuit without arranging a chip capacitor between the data source and the transmission interface.

As a result, the chip serving as the data source and the chip of the transmission interface can be mounted at high density without causing an increase in power consumption by the DC current and disconnection of the transmission line.

Second Embodiment

A connecting circuit and a communication interface according to the second embodiment of the present invention will be described with reference to FIGS. 4 and 5.
<Arrangements of Connecting Circuit and Communication Interface>

Figure 4:
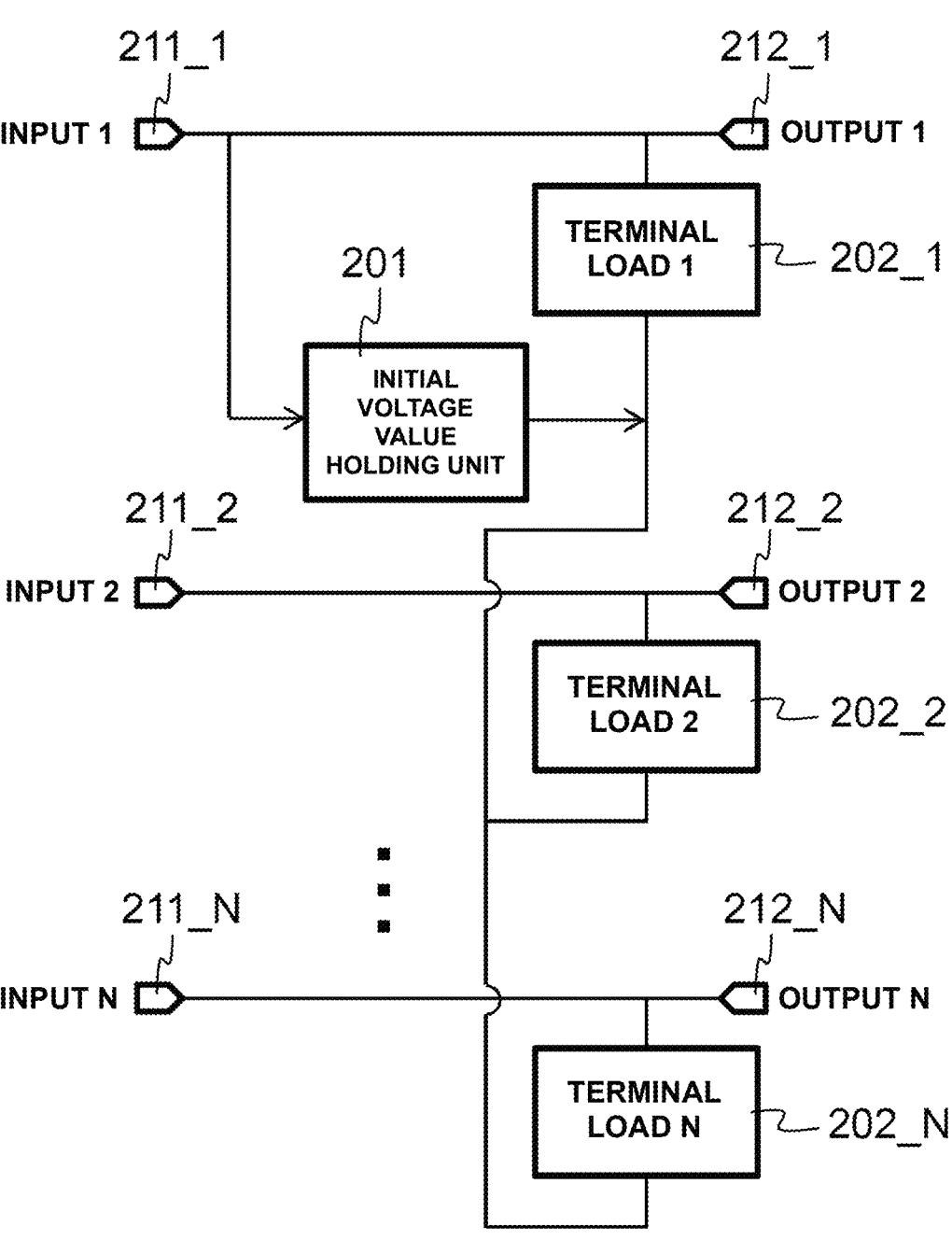
FIG. 4 is a block diagram showing the arrangement of a connecting circuit according to the second embodiment of the present invention.

As shown in FIG. 4, a connecting circuit 20 according to the embodiment includes, for a plurality of (N) inputs and outputs, an initial voltage value holding circuit 201, and a plurality of (N) terminating loads 202_1 to 202_N. The output of the initial voltage value holding circuit 201 is connected to the plurality of (N) terminating loads 202_1 to 202_N. The initial voltage value holding circuit 201 is similar to that in the first embodiment.

Figure 5:
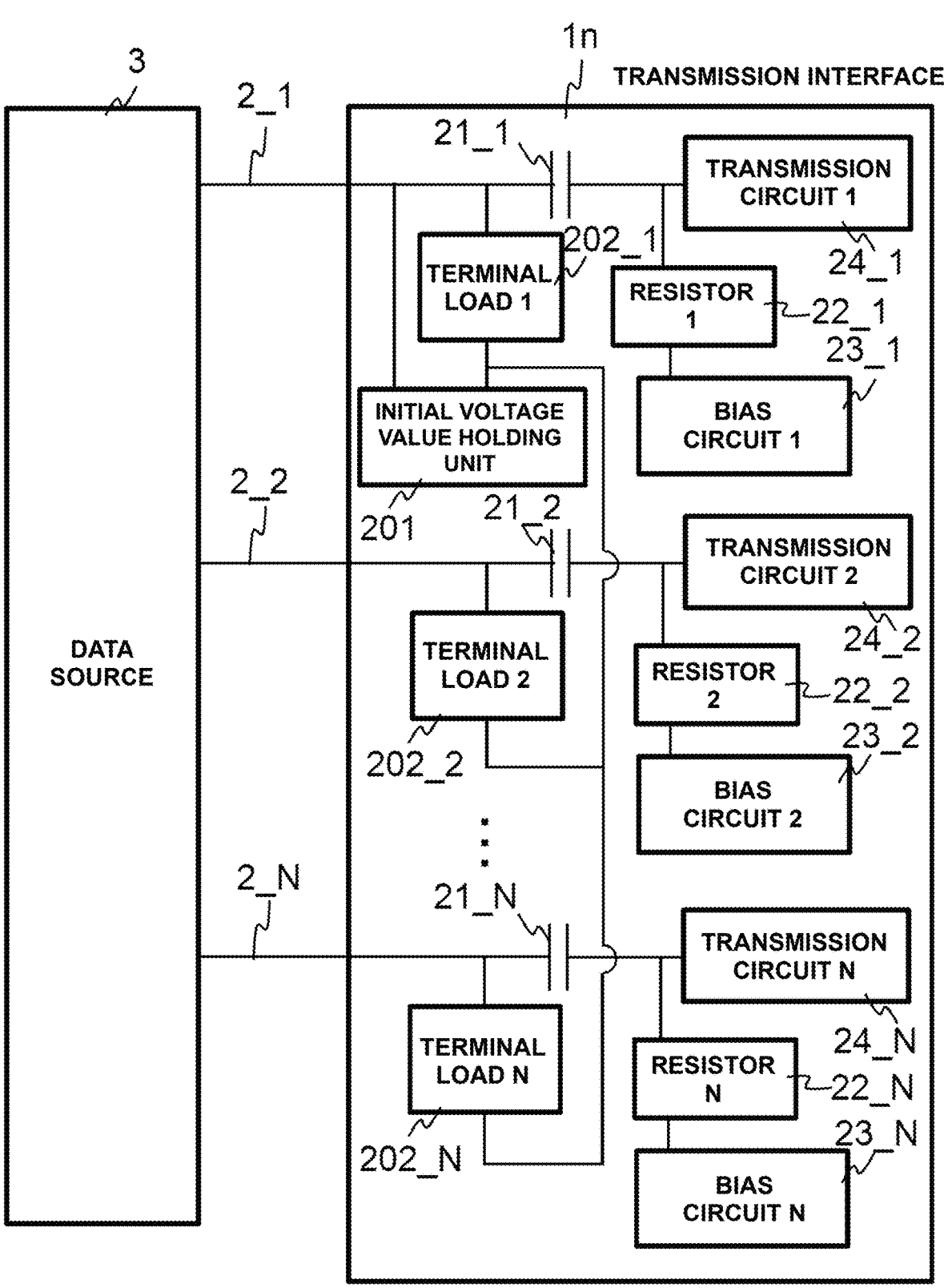
FIG. 5 is a block diagram showing the arrangement of a transmission interface using the connecting circuit according to the second embodiment of the present invention.

As shown in FIG. 5, a transmission interface using the connecting circuit 20 according to the embodiment includes the connecting circuit 20, N capacitors 21_1 to 21_N, N resistors 22_1 to 22_N, N bias circuits 23_1 to 23_N, and N transmission circuits 24_1 to 24_N. The outputs of the N terminating loads 202_1 to 202_N of the connecting circuit 20 are input (connected) to the N capacitors 21_1 to 21_N, respectively. Circuit arrangements by the capacitors 21_1 to 21_N, the resistors 22_1 to 22_N, the bias circuits 23_1 to 23_N, and the transmission circuits 24_1 to 24_N are similar to those in the first embodiment.
<Operation of Connecting Circuit>

Similar to the first embodiment, the initial voltage value holding circuit 201 outputs an initial voltage value regardless of input of a data signal. In the connecting circuit 20 according to the embodiment, the initial voltage value is output to one terminal (initial voltage value holding circuit 201 side) of each of the terminating loads 202_1 to 202_N regardless of input of a data signal.

In response to this, similar to the first embodiment, the same voltage is applied by the DC component to the two ends of each of the terminating loads 202_1 to 202_N. Since there is no potential difference between the two ends of each of the terminating loads 202_1 to 202_N, no DC current flows from a data source 3 to the terminating loads 202_1 to 202_N.

If the specification of an electric signal is the same in all inputs (i to N), a DC current from the data source 3 does not flow into the terminating loads 202_1 to 202_N even when the output (initial voltage value) of the initial voltage value holding circuit 201 connected to one input terminal (for example, an input terminal 211_1) is input (connected) to one terminal of each of the terminating loads 202_1 to 202_N.

As described above, the connecting circuit according to the embodiment can suppress a DC current flowing from the data source to the terminating loads on the preceding stage of the transmission circuits without arranging a chip capacitor between the data source and a transmission interface including a plurality of transmission circuits.

The chip serving as the data source and the chip of the transmission interface can be mounted at high density without causing an increase in power consumption by the DC current and disconnection of the transmission line.

In the connecting circuit according to the embodiment, only one initial voltage value holding circuit is arranged, so the power consumption and the chip area can be reduced in comparison with an arrangement in which initial voltage value holding circuits are arranged for all inputs.

Third Embodiment

A connecting circuit and a communication interface according to the third embodiment of the present invention will be described with reference to FIGS. 6 and 7. The connecting circuit according to the embodiment is different from the connecting circuit according to the second embodiment in the arrangement of an initial voltage value holding circuit. The remaining arrangement is similar to that in the second embodiment.

<Arrangement of Connecting Circuit>

Figure 6:
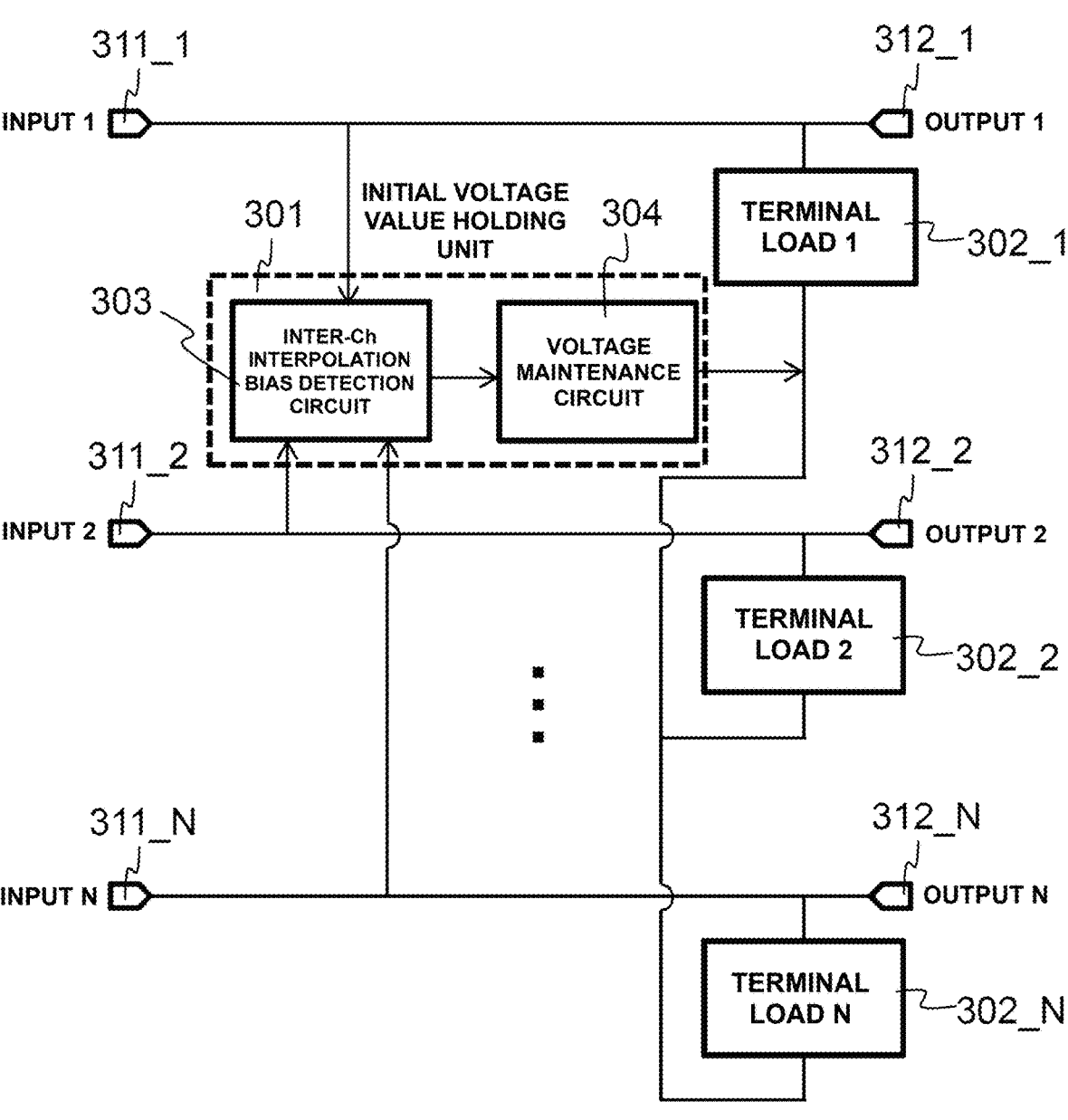
FIG. 6 is a block diagram showing the arrangement of a connecting circuit according to the third embodiment of the present invention.
Figure 7:
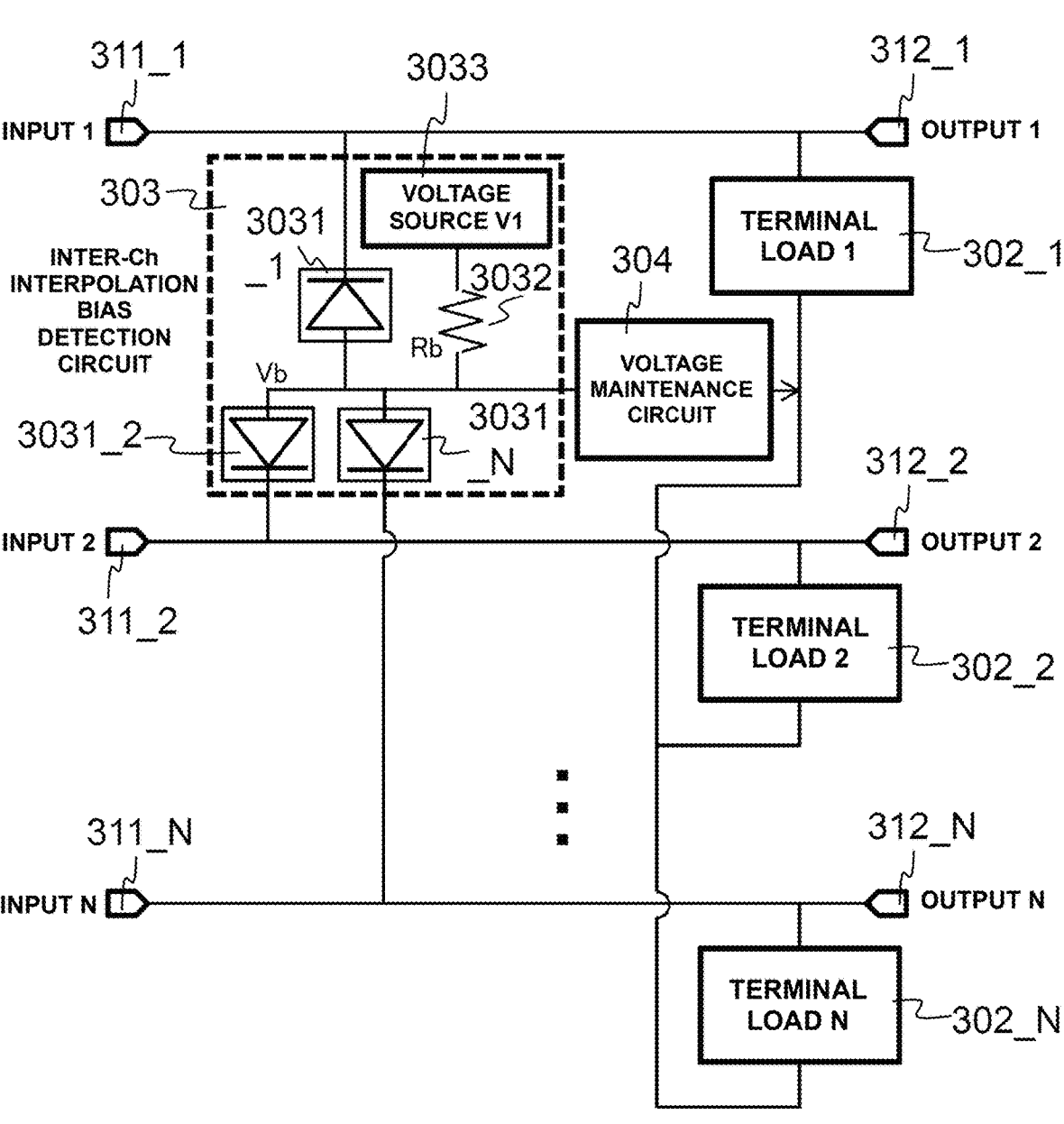
FIG. 7 is a block diagram showing the arrangement of the connecting circuit according to the third embodiment of the present invention.

As shown in FIG. 6, a connecting circuit 30 according to the embodiment includes an initial voltage value holding circuit 301, and N terminating loads 302_1 to 302_N. The initial voltage value holding circuit 301 is an initial voltage value holding circuit that copes with multiple channels. In the connecting circuit 3o, the initial voltage value holding circuit 301 detects a signal of a low voltage among signals of a plurality of (N) channels, and applies it as an initial voltage value to a terminal (one terminal) of each of the terminating loads 302_1 to 302_N.

The initial voltage value holding circuit 301 includes an inter-channel (ch) interpolation bias detection circuit 303 and a voltage maintenance circuit 304.

The inter-channel (ch) interpolation bias detection circuit 303 is connected to input terminals 311_1 to 311_N, and detects a signal of a low voltage among signals of a plurality of channels. More specifically, as shown in FIG. 7, the inter-ch interpolation bias detection circuit 303 includes diode circuits 3031_1 to 3031_N between the input terminals 311_1 to 311_N and the input of the voltage maintenance circuit 304, and a resistor (Rb) 3032 connected to a voltage source (V1) 3033 is connected to the input of the voltage maintenance circuit 304. The diode circuits 3031_1 to 3031_N are ideal diode circuits having a forward threshold voltage of 0 V.

The voltage maintenance circuit 304 outputs the voltage of a signal detected by the inter-ch interpolation bias detection circuit 303 to the terminating loads 302_1 to 302_N.

<Operation of Connecting Circuit>

First, the operation of the inter-ch interpolation bias detection circuit 303 will be described. The voltage V1 of the voltage source is set in advance to satisfy VL<V1<VH between the low voltage VL and high voltage VH of an input signal.

When the voltage VL is input as an initial voltage value to one input terminal (for example, the input terminal 311_1) out of the input terminals 311_1 to 311_N, the voltage VL is applied in the forward direction to turn on the diode circuit (for example, 3031_1) because of V1>VL. Hence, an input voltage Vb of the voltage maintenance circuit 304 becomes equal to VL. Since the diode circuit in which the input voltage is VH is OFF, VH does not influence Vb.

The CR time constant is formed by the Rb 3032 and the parasitic capacitance of a diode or the like present at the input of the voltage maintenance circuit 304. After all the input terminals 311_1 to 311_N change to VH, Vb changes to V1 in accordance with the CR time constant. As a result, after the lapse of a predetermined time determined by the CR time constant, Vb=V1. If a state in which all the input terminals 311_1 to 311_N become VH is not continued for a predetermined time or longer, Vb does not change from VL. In other words, Vb maintains the VL state in most of the time.

If Vb=V1, a signal changes between V1 and VH and the signal change amount (amplitude) decreases, compared to a case where the signal changes between VL and VH when Vb=VL. This results in a disadvantage in which, for example, detection of a signal becomes difficult.

The probability at which the above-described change of Vb from VL occurs will be explained below.

The probability at which the change of Vb occurs is calculated as follows by determining the CR time constant so that Vb changes when a state in which all the input terminals 311_1 to 311_N become VH is generated successively for 10 bits.

Assuming that the bit rate is 10 Gbps, the probability at which VH continues for 10 bits is 1/210. For N=1, 210/10 Gbps=102.4 nsec, and Vb shifts once in 102.4 nsec. For N=8, the probability at which VH continues for 10 bits in all channels is 1/280, and 280/10 Gbps=1.21×1014 sec=3.8× 106 years. From this result, Vb changes only once in 3.8×106 years. As the number of channels increases, the probability at which Vb changes decreases.

Since the probability at which the change of Vb from VL occurs is very low, the change of Vb from VL rarely occurs.

In this way, when the voltage VL is input as an initial voltage value to the inter-ch interpolation bias detection circuit 303, the input voltage Vb of the voltage maintenance circuit 304 is maintained at the initial voltage value VL.

Next, the operation of the connecting circuit 3o will be explained.

As described above, the input Vb of the voltage maintenance circuit 304 is maintained at the low voltage VL serving as the initial voltage value, so an output from the voltage maintenance circuit 304 to the terminating loads 302_1 to 302_N is also maintained at the low voltage VL.

In the initial voltage value holding circuit 301, when the voltage VL is input to one input terminal out of the input terminals 311_1 to 311_N, the low voltage VL is kept applied to one terminal (initial voltage value holding circuit 301 side) of each of the terminating loads 302_1 to 302_N.

As a result, similar to the first and second embodiments, the same voltage is applied by the DC component to the two ends of each of the terminating loads 302_1 to 302_N. Since there is no potential difference between the two ends of each of the terminating loads 302_1 to 302_N, no DC current flows from a data source 3 to the terminating loads 302_1 to 302_N.

Similar to the second embodiment, the connecting circuit 3o according to the embodiment can be used for a transmission interface. The transmission interface includes the connecting circuit 30, a plurality of capacitors, a plurality of resistors, a plurality of bias circuits, and a plurality of transmission circuits. Each bias circuit is connected to each transmission circuit via each resistor, and in parallel with this, each transmission circuit is connected to each capacitor.

In the connecting circuit 30, the input terminals 311_1 to 311_N are connected to a plurality of transmission lines extending from the data source, respectively. Output terminals 312_1 to 312_N are connected to the capacitors, respectively.

As described above, the connecting circuit according to the embodiment can suppress a DC current flowing from the data source to the terminating loads on the preceding stage of the transmission circuits without arranging a chip capacitor between the data source and a transmission interface including a plurality of transmission circuits.

The chip serving as the data source and the chip of the transmission interface can be mounted at high density without causing an increase in power consumption by the DC current and disconnection of the transmission line.

When a signal is input to the other input terminal before input to the initial voltage value holding circuit, the connecting circuit according to the second embodiment cannot suppress a DC current flowing from the data source to the terminating load on the preceding stage of the transmission circuit. To the contrary, the connecting circuit according to the third embodiment detects the low voltage VL with respect to input signals 1 to N, and can suppress a DC current flowing from the data source to the terminating load on the preceding stage of the transmission circuit regardless of which of the input terminals 1 to N receives a signal.

In the embodiments of the present invention, the structure, dimensions, material, and the like of each component have been exemplified in the arrangement, manufacturing method, and the like of the connecting circuit, but the present invention is not limited to them as long as the functions of the connecting circuit are implemented and the effects are obtained.

INDUSTRIAL APPLICABILITY

The embodiments of the present invention are directed to a connecting circuit connected to a transmission circuit and a communication interface, and can be applied to a communication transmission system.

EXPLANATION OF THE REFERENCE NUMERALS AND SIGNS

1 . . . transmission interface, 2 . . . transmission line, 3 . . . data source, 10 . . . connecting circuit, 11 . . . capacitor, 12 . . . resistor, 13 . . . bias circuit, 14 . . . transmission circuit, 101 . . . initial voltage value holding unit, 102 . . . terminating load, 103 . . . initial voltage value detection circuit, 104 . . . voltage maintenance circuit, 105 . . . frame detection circuit.

The invention claimed is:

1. A connecting circuit connected to a preceding stage of a transmission circuit to which a data signal is input, the connecting circuit comprising:

an initial voltage value holding circuit; and a terminating load connected in series with the initial voltage value holding circuit, wherein the initial voltage value holding circuit is configured to output, to the terminating load, an initial voltage value obtained when the data signal is not input, and sets both ends of the terminating load at the same potential in terms of a DC component.

2. The connecting circuit according to claim 1, wherein the initial voltage value holding circuit includes:

a frame detection circuit configured to detect an input of the data signal and output a frame detection signal;

a signal delay circuit configured to delay the data signal;

a sample-and-hold circuit configured to receive the data signal delayed by the signal delay circuit, detect the initial voltage value obtained when the data signal is not input, hold the initial voltage value in response to the input of the frame detection signal, and output the initial voltage value; and a voltage maintenance circuit configured to output the initial voltage value from the sample-and-hold circuit to the terminating load.

3. The connecting circuit according to claim 1, wherein the terminating load includes a plurality of terminating loads.

4. The connecting circuit according to claim 1, wherein the signal delay circuit is connected in parallel with the frame detection circuit.

5. The connecting circuit according to claim 1, wherein the transmission circuit includes a plurality of transmission circuits to which a plurality of data signals are input, the termination load is provided for each of the plurality of transmission circuits, the initial voltage value holding circuit includes an inter-channel interpolation bias detection circuit configured to detect, as the initial voltage value, a signal of a low voltage among the plurality of input data signals, and a voltage maintenance circuit configured to receive an output of the inter-channel interpolation bias detection circuit and apply the output to the terminating load.

6. The connecting circuit according to claim 5, wherein the inter-channel interpolation bias detection circuit includes a plurality of diode circuits, and a voltage source connected to an input of the voltage maintenance circuit via a resistor, wherein each of the plurality of data signals is input to one end of each of the plurality of diode circuits, and wherein the other end of each of the plurality of diode circuits is connected to the input of the voltage maintenance circuit.

7. The connecting circuit according to claim 6, wherein when the signal of the low voltage is input to one diode circuit among the plurality of diode circuits, the inter-channel interpolation bias detection circuit is configured to output the signal of the low voltage to the voltage maintenance circuit.

8. A communication interface comprising the connecting circuit according to claim 1.

9. The connecting circuit according to claim 2, wherein the terminating load includes a plurality of terminating loads.

10. The connecting circuit according to claim 4, wherein the terminating load includes a plurality of terminating loads.

11. A communication interface comprising the connecting circuit according to claim 2.

12. A communication interface comprising the connecting circuit according to claim 3.

13. A communication interface comprising the connecting circuit according to claim 4.

14. A communication interface comprising the connecting circuit according to claim 5.

15. A communication interface comprising the connecting circuit according to claim 6.

16. A communication interface comprising the connecting circuit according to claim 7.

* * * * *